(12) United States Patent
Soga et al.

(10) Patent No.: US 7,611,606 B2
(45) Date of Patent: Nov. 3, 2009

(54) LOW-DENSITY NEUTRAL PAPER

(75) Inventors: Kazunari Soga, Tokyo (JP); Dai Nagahara, Tokyo (JP); Kazuyuki Fujita, Tokyo (JP); Takashi Ochi, Tokyo (JP); Koji Kutsuwa, Tokyo (JP); Katsumasa Ono, Tokyo (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 398 days.

(21) Appl. No.: 10/599,135

(22) PCT Filed: Mar. 15, 2005

(86) PCT No.: PCT/JP2005/004574

§ 371 (c)(1),
(2), (4) Date: Dec. 7, 2006

(87) PCT Pub. No.: WO2005/098132

PCT Pub. Date: Oct. 20, 2005

(65) Prior Publication Data

US 2007/0221350 A1    Sep. 27, 2007

(30) Foreign Application Priority Data

Mar. 30, 2004  (JP) ............................. 2004-099184
Mar. 30, 2004  (JP) ............................. 2004-100698
Jul. 5, 2004    (JP) ............................. 2004-197730

(51) Int. Cl.
*D21H 11/00* (2006.01)
(52) U.S. Cl. .................... 162/181.1; 152/146; 428/326
(58) Field of Classification Search .................. None
See application file for complete search history.

(56) References Cited

U.S. PATENT DOCUMENTS

2008/0096008 A1 * 4/2008 Yoshimura et al. .......... 428/326

FOREIGN PATENT DOCUMENTS

| JP | 58-9847 | 6/1983 |
|---|---|---|
| JP | 03-124895 | 5/1991 |
| JP | 03-269199 | 11/1991 |
| JP | 04-185792 | 7/1992 |
| JP | 09-078491 | 3/1997 |
| JP | 09-176985 | 7/1997 |
| JP | 10-204790 | 8/1998 |
| JP | 10-226982 | 8/1998 |
| JP | 2001-247310 | 9/2001 |
| JP | 2002-038395 | 2/2002 |
| JP | 2002-201590 | 7/2002 |
| JP | 2002-201592 | 7/2002 |
| JP | 2003-020223 | 1/2003 |
| JP | 2003-049389 | 2/2003 |
| JP | 2003-063821 | 3/2003 |
| JP | 2003-137544 | 5/2003 |
| JP | 2003-212539 | 7/2003 |
| JP | 2003-321221 | 11/2003 |
| JP | 2004-289221 | * 9/2004 |

* cited by examiner

*Primary Examiner*—Mark Halpern
(74) *Attorney, Agent, or Firm*—Knobbe, Martens, Olson & Bear LLP

(57) ABSTRACT

The present invention provides a low-density neutral paper offering excellent opacity, opacity after printing and other advantageous printability properties despite high bulk, by containing, as a filler, precipitated calcium carbonate-silica composite having an average particle size of 30 μm or less and produced by neutralizing a mixture of precipitated calcium carbonate and alkaline silicate to pH 7 to 9, wherein the ratio of precipitated calcium carbonate to silica (precipitated calcium carbonate/silica) is 30/70 to 70/30 in solid content by weight and the surface of precipitated calcium carbonate particles is covered with silica. In particular, the present invention provides a low-density printing paper, or an electrophotographic transfer paper offering excellent stiffness and copier suitability, by means of adjusting the filler content in paper to a range of 1 to 25 solid content percent by weight, or provides a neutral newsprinting paper by means of adjusting the filler content in paper to a range of 0.1 to 25 solid content percent by weight.

17 Claims, No Drawings

LOW-DENSITY NEUTRAL PAPER

This application is the U.S. National Phase under 35 U.S.C. 371 of International Application PCT/JP2005/004574, filed Mar. 15, 2005, which claims priority to Japanese Patent Application No. 2004-099184, filed Mar. 30, 2004, Japanese Patent Application No. 2004-100698, filed Mar. 30, 2004, Japanese Patent Application No. 2004-197730, filed Jul. 5, 2004. The International Application was not published under PCT Article 21(2) in English.

TECHNICAL FIELD

The present invention relates to a low-density neutral paper offering excellent opacity and opacity after printing despite low density (high bulk).

The low-density neutral paper proposed by the present invention is suitable, in particular, for printing paper, neutral newsprinting paper, or electrophotographic transfer paper.

BACKGROUND ART

Issues affecting the global environment are drawing the attention in various paper-related fields of late, such as "global warming" and "release of dioxins and other harmful substances into the environment as a result of waste incineration." As a way to address these global environment issues through recycling of paper materials, utilization of recycled paper has become popular. However, high-quality recycled pulp itself is becoming less accessible due to widening applications of recycled pulp, higher blending ratios of recycled pulp in paper products, and growing exports of recycled pulp to China, etc. In light of these circumstances, reduction of pulp consumption is desired, as it will not only contribute to the preservation of our global environment, but it will also permit effective utilization of forest resources.

Key applications of paper include those involving fixation of some sort of information onto paper surface. In these applications, paper surface plays the most important role. Specifically, it is desired that a large paper surface area be provided with the minimum amount of pulp, and when printability, transportability, shipment and other handling properties of paper are considered, paper whose weight per unit area is small without changing its thickness, or specifically low-density paper or bulky paper, is preferred in these applications. Here, "fixation of information" refers to fixing text, image or other information onto paper surface by means of printing presses, copiers, and various printers. The paper media onto which information is fixed include, for example, wrapping paper, book paper, newsprinting paper, and various types of so-called information recording paper (electrophotographic transfer paper, inkjet recording paper, thermo-sensitive recording paper, pressure-sensitive recording paper, etc.). From the viewpoint of storage stability of paper on which information has been fixed, paper obtained by a neutral papermaking process is more desirable than paper obtained by an acid papermaking process.

Turning to printing paper such as book paper, which is one area of paper application, the types of popular books are quickly shifting from those of serious contents to more casual comic books and paperbacks, as today's generations are fast abandoning books in favor of other information media. In general, these comic books and paperbacks must be easy to carry and lightweight. For this reason, one key quality requirement demanded by publishers and other users of printing paper is lightness of paper. Reducing the weight of paper means reducing its density while maintaining the thickness, or more specifically, making the paper bulkier.

As conventional technologies to increase paper bulk, one method is to use a bulky pulp composition obtained by reacting a mixture of pulp and hydrophilic fiber with a bridging agent (refer to Patent Literature 1). Another method is to mix cellulose pulp, composite polyester fibers of specific type, and thermo-fusing binder, to produce a bulky pulp sheet (refer to Patent Literature 2). However, use of bridging pulp, synthetic fiber, etc., will make the resulting paper non-recyclable. Yet another method that has been proposed is to produce a bulky book binding paper by using pulp made from a specific tree type (refer to Patent Literature 3). However, it is difficult to produce pulp from a single type of trees in today's environment where the sentiment against logging is becoming increasingly strong.

On the other hand, a number of methods have been examined to produce a bulky paper using internal fillers. One such technology is to produce a bulky neutral paper by filling hollow, spherical vaterite calcium carbonate (refer to Patent Literature 4). However, this is a special filler and its utilization in practical applications is difficult when productivity is considered. Another method that has been disclosed is to produce a bulky printing paper by using amorphous silica or silicate with a bulk specific gravity of 0.3 g/cm$^3$ or less (refer to Patent Literature 5). If a substance of such low specific gravity is used as a filler, however, paper bulk will increase but paper stiffness and sizing property will decrease. Also, such filler results in lower opacity compared to calcium carbonate, etc., and its use in printing paper prevents achievement of good printability.

If the aforementioned printing paper is to be used for offset printing, one essential requirement from the viewpoint of ensuring printability is to add to the paper a certain characteristic needed to suppress water permeation into the paper (sizing property). Paper using white carbon is unable to maintain good printability because its sizing property is significantly lower. In general, fillers of large BET specific surface areas are known to have the tendency to reduce the effects of sizing agents. White carbon is constituted by primary particles agglutinating with one another to exhibit higher bulk and oil absorbency compared to other fillers. On the other hand, however, white carbon is also associated with a significantly larger specific surface area than other fillers. This is considered one reason why use of white carbon as an internal filler reduces the effects of sizing agents. As a result, the obtained paper exhibits poor sizing property.

Turning to newsprinting paper, which is another area of paper application, newspaper printing technology is fast advancing in the areas of offset printing, color printing and high-speed volume printing. Accordingly, the printing medium, or newsprinting paper in this case, is being required to offer better color printability and printing efficiency. In particular, the need to prevent strike-though, which is a phenomenon where text and image printed on one side of paper shows through on the other side, is becoming stronger each year to ensure better opacity after printing. Also, newsprinting paper is becoming increasingly lighter to improve printing efficiency and also to reduce newspaper shipping costs. Improvement of strike-through is one essential requirement that must be addressed in the effort to reduce the weight of newsprinting paper.

Achieving higher paper opacity and oil absorbency is known as the most effective way to reduce strike-through of newsprinting paper. One way to effectively increase opacity is to add titanium dioxide having a high specific scattering coefficient. However, titanium dioxide is expensive and it is not economical to add it to paper in large quantities. Another effective way to suppress strike-through of acid newsprinting paper is to add fillers of high oil absorbency, and white carbon has been used widely for this purpose.

One new technology that has emerged with respect to newsprinting paper is a neutral process of making newsprinting paper. Specifically, a neutral newsprinting paper containing 5 to 15 percent by weight of calcium carbonate as a filler, as well as its production method, are disclosed with the aim of providing a neutral newsprinting paper offering strength, opacity, resin retention, and wear resistance in offset printing, of levels equivalent to or better than those offered by acid newsprinting paper (refer to Patent Literature 6).

Also, technologies are known that relate to the blending of fillers in neutral newsprinting paper. For example, a method of producing paper (including newsprinting paper) is presented, which uses as a filler a mixture of hydrated silicate and precipitated calcium carbonate or ground calcium carbonate, exhibiting an oil absorbency of 250 to 350 ml per 100 g and having specific particle characteristics including a total pore volume of 4.0 to 6.0 cc/g, average pore radius of 200 to 400 angstroms, and average particle size of 3.0 to 15 μm as measured by the laser method (refer to Patent Literature 7). In addition, newsprinting paper is disclosed in which a filler, mainly made of white carbon and calcium carbonate, is mixed with $SiO_2$ and CaO at a ratio of 9:1 to 5:5 based on ash atomic absorption spectrophotometry at 550° C. as specified in JIS P 8128 (refer to Patent Literature 8). However, the aforementioned technologies do not provide sufficient opacity or strike-through suppression effect. Separately, a neutral newsprinting paper containing titanium dioxide-calcium carbonate composite and having a grammage of 45 g/m$^2$ or less is disclosed (refer to Patent Literature 9). However, this paper uses expensive titanium dioxide, which is not desirable.

Turning to information recording paper such as electrophotographic transfer paper, pulp is used to increase paper bulk, i.e., to reduce paper density. Among the types of pulp that can be used for this purpose, ground pulp produced by grinding wood using a grinder, refiner mechanical pulp produced by fine-grinding wood using a refiner, and thermo-mechanical pulp and other types of mechanical pulp, provide rigid fibers and are more advantageous to density reduction compared to chemical pulp produced by using chemicals to extract lignin, a type of reinforcement material, from wood fibers. However, ground pulp and refiner pulp receive strong mechanical friction and shear force and thus pulp fibers become finer and shorter. As a result, paper strength decreases.

For the aforementioned reason, traditionally mechanical pulp is made from coniferous trees with long fibers. However, coniferous trees contain a lot of lignin and thus are unable to produce pulp offering high levels of brightness. In particular, conventional mechanical pulp is not suitable for electrophotographic transfer paper, where high brightness is often required to provide better color reproducibility and higher product value in line with the growing need for color printing. Among the various types of mechanical pulp, thermo-mechanical pulp does not present the problems associated with fine fibers, and is able to maintain sheet stiffness. However, paper made from thermo-mechanical pulp offers poor smoothness and insufficient image reproducibility. For example, a method is disclosed wherein thermo-mechanical pulp (TMP) or other high-yield pulp is used to reduce grammage while maintaining opacity and stiffness (refer to Patent Literature 10). However, paper produced by such method provides poor properties such as brightness, and does not offer sufficient color reproducibly to meet the requirement for color printing.

Various ways are also examined to increase paper bulk through the use of inorganic fillers, etc., offering lower specific gravity than pulp. For example, use of the filler disclosed in Patent Literature 5, made of amorphous silica or silicate with a bulk specific gravity of 0.3 g/cm$^3$ or less, does increase bulk by keeping paper density low. If this filler is used for electrophotographic transfer paper, however, paper stiffness drops, which in turn results in reduced suitability for copying such as poor run and low work efficiency.

[Patent Literature 1] Specification of Japanese Patent No. 2903256

[Patent Literature 2] Specification of Japanese Patent No. 2591685

[Patent Literature 3] Specification of Japanese Patent No. 1755152

[Patent Literature 4] Specification of Japanese Patent No. 3306860

[Patent Literature 5] Specification of Japanese Patent No. 2889159

[Patent Literature 6] Specification of Japanese Patent No. 2960002

[Patent Literature 7] Japanese Patent Laid-open No. 2002-201590

[Patent Literature 8] Japanese Patent Laid-open No. 2002-201592

[Patent Literature 9] Japanese Patent Laid-open No. 2002-38395

SUMMARY OF THE INVENTION

Problems to Be Solved by the Invention

In light of the aforementioned situation, the present invention is intended to provide a low-density neutral paper of higher bulk and neutrality offering excellent opacity and opacity after printing, which can be used for all types of paper and made from all types of pulp; specifically in the area of printing paper, the object of the present invention is to provide a printing paper offering good printability, such as opacity and opacity after printing, despite high bulk; in the area of newsprinting paper, it is to provide a neutral newsprinting paper offering high brightness, excellent opacity and reduced strike-through after printing; and in the area of electrophotographic transfer paper, it is to provide an electrophotographic transfer paper offering low density (high bulk), excellent brightness and opacity, as well as good printability on a copier or laser printer such as smooth run and high work efficiency, while maintaining stiffness.

Means for Solving the Problems

The present invention resolved the above problems by providing the following:

[1] A low-density neutral paper characterized by containing as a filler a precipitated calcium carbonate-silica composite wherein a surface of precipitated calcium carbonate particles is covered with silica and a ratio of precipitated calcium carbonate to silica (precipitated calcium carbonate/silica) is 30/70 to 70/30 in solid content by weight.

[2] A low-density neutral paper according to [1], wherein the low-density neutral paper is a printing paper, neutral newsprinting paper or electrophotographic transfer paper.

[3] A low-density neutral paper according to [1], wherein the low-density neutral paper is a printing paper or electrophotographic transfer paper containing the precipitated calcium carbonate-silica composite at a filler content in paper of 1 to 25 solid content percent by weight.

[4] A low-density neutral paper according to [1], wherein the low-density neutral paper is a neutral newsprinting paper containing the precipitated calcium carbonate-silica composite at a filler content in paper of 0.1 to 25 solid content percent by weight.

[5] A low-density neutral paper according to any one of [1] to [4], wherein the average particle size of the precipitated calcium carbonate-silica composite is 30 μm or less.

[6] A low-density neutral paper according to any one of [1] to [5], wherein the precipitated calcium carbonate particles used to produce the precipitated calcium carbonate-silica composite are constituted by rosette-calcite precipitated calcium carbonate where spindle-shaped primary particles agglutinate with one another to form secondary particles.

As mentioned above, the present invention provides a low-density (bulky) neutral paper particularly suitable for printing paper, newsprinting paper and electrophotographic transfer paper.

EFFECTS OF THE INVENTION

The low-density neutral paper proposed by the present invention offers excellent opacity and opacity after printing. When applied to printing paper, the present invention achieves excellent opacity and opacity after printing despite high bulk, and also exhibits excellent sizing property. When applied to newsprinting paper, the present invention achieves high brightness, excellent opacity, and effective strike-through improvement effect after printing. When applied to electrophotographic transfer paper, the present invention achieves low density (high bulk), excellent brightness and opacity, as well as good printability on a copier or laser printer such as smooth run and high work efficiency, while maintaining stiffness.

BEST MODE FOR CARRYING OUT THE INVENTION

The low-density neutral paper proposed by the present invention uses precipitated calcium carbonate-silica composite particles for the entire or partial volume of the filler used.

As explained later, the precipitated calcium carbonate-silica composite used as the filler in this low-density neutral paper comprises precipitated calcium carbonate particles whose surface is covered with silica, wherein the ratio of precipitated calcium carbonate to silica (precipitated calcium carbonate/silica) is 30/70 to 70/30 in solid content by weight. This precipitated calcium carbonate-silica compound provides low density (high bulk) as well as excellent brightness, opacity and stiffness retention property, among others. If the ratio of precipitated calcium carbonate to silica is below 30/70, opacity, sizing property and stiffness become lower. If the ratio of precipitated calcium carbonate to silica exceeds 70/30, bulk becomes less desirable.

Since precipitated calcium carbonate-silica compound particles contain precipitated calcium carbonate in their interior, the precipitated calcium carbonate in the particles may break down or dissolve due to acidity if an acid papermaking process is used. Therefore, the present invention should desirably be implemented in a papermaking environment of neutral to alkaline, corresponding to pH 6 to 9. In an alkaline condition exceeding pH 9, brightness drops.

The low-density printing paper proposed by the present invention is explained below. The types and blending ratios of pulp materials used are determined by the grade of target paper, such as premium, medium or low-end, and not limited in any way. For example, one or more types can be selected and/or combined from among the following: kraft pulp (KP) and other types of chemical pulp; stone ground pulp (SGP), pressure stone ground pulp (PGP), refiner ground pulp (RGP), chemi-ground pulp (CGP), thermo-ground pulp (TGP), ground pulp (GP), thermo-mechanical pulp (TMP), chemi-thermo mechanical pulp (CTMP), refiner mechanical pulp (RMP) and other types of mechanical pulp (MP); and deinked pulp (DIP) and other types of recycled pulp.

This low-density printing paper uses, for the entire or partial volume of the filler used, precipitated calcium carbonate-silica compound particles comprising precipitated calcium carbonate particles whose surface is covered with silica, as produced by the method explained later. These precipitated calcium carbonate-silica compound particles offer an excellent effect of reducing paper density, as well as high oil absorbency and superior opacity improvement effect. The low-density printing paper proposed by the present invention should contain such precipitated calcium carbonate-silica compound particles preferably by 1 to 25 solid content percent by weight, or more preferably by 3 to 25 solid content percent by weight, or most preferably by 5 to 25 solid content percent by weight, with respect to the paper. If the filler content in paper is less than 1 solid content percent by weight, sufficiently low density and amply high opacity as required of printing paper cannot be obtained.

Under the present invention, it is also possible to use, in addition to precipitated calcium carbonate-silica compound particles, other inorganic and organic fillers as long as use of such other fillers does not reduce the effect intended by the present invention. As for the specific types of fillers, any fillers normally used in neutral or alkaline papermaking processes can be used without any limitation. For example, one or more types selected from magnesium carbonate, barium carbonate, aluminum hydroxide, calcium hydroxide, magnesium hydroxide, zinc hydroxide, clay, calcined kaolin, delaminated kaolin, titanium dioxide, zinc oxide, silicon oxide, non-crystalline silica and other inorganic fillers, as well as urea-formalin resin, polystyrene resin, phenol resin and other fine hollow particles, can be used together. When precipitated calcium carbonate-silica compound particles and other filler or fillers are used together, the ratio of all fillers to the paper should be preferably over 1.0 but no more than 40 solid content percent by weight, or more preferably over 3 but no more than 40 solid content percent by weight, or most preferably over 5 but no more than 40 solid content percent by weight. If the ratio exceeds 40 solid content percent by weight, the resulting paper breaks easily due to lower paper strength, and handling becomes difficult. Such paper also generates a lot of paper dust during printing.

The neutral newsprinting paper proposed by the present invention is explained below. Here, any material pulp can be used without limitation, as long as it is normally used in the production of newsprinting paper. For example, one or more types can be selected from among the following: stone ground pulp (SGP), pressure stone ground pulp (PGP), refiner ground pulp (RGP), chemi-ground pulp (CGP), thermo-ground pulp (TGP), ground pulp (GP), thermo-mechanical pulp (TMP), chemi-thermo mechanical pulp (CTMP), refiner mechanical pulp (RMP) and other types of mechanical pulp (MP); and deinked pulp (DIP) and other types of recycled pulp. Kraft pulp (KP) and other types of chemical pulp (CP) can also be used, if necessary.

The paper should contain the filler comprising the aforementioned precipitated calcium carbonate-silica compound as a filler, preferably by 0.1 to 25 solid content percent by weight, or more preferably by 0.2 to 25 solid content percent by weight, or most preferably by 0.3 to 25 solid content percent by weight. If the filler content in paper is less than 0.1 solid content percent by weight, sufficient opacity and strike-through improvement effect cannot be achieved.

The neutral newsprinting paper proposed by the present invention can also use, in addition to precipitated calcium carbonate-silica compound particles, other inorganic and organic fillers as long as use of such other fillers does not reduce the effect intended by the present invention, just like with the aforementioned low-density printing paper. As for the specific types of fillers, any fillers normally used in neutral or alkaline papermaking processes can be used without any limitation. For example, one or more types selected from magnesium carbonate, barium carbonate, aluminum hydroxide, calcium hydroxide, magnesium hydroxide, zinc hydroxide, clay, calcined kaolin, delaminated kaolin, titanium dioxide, zinc oxide, silicon oxide, non-crystalline silica and other inorganic fillers, as well as urea-formalin resin, polystyrene resin, phenol resin and other fine hollow particles, can be used together. When precipitated calcium carbonate-silica compound particles and other filler or fillers are used together, the ratio of all fillers to the paper should be preferably over 1.0 but no more than 40 solid content percent by weight, or more preferably over 3 but no more than 40 solid content percent by weight, or most preferably over 5 but no more than 40 solid content percent by weight. If the ratio exceeds 40 solid content percent by weight, the resulting paper breaks easily due to lower paper strength, and handling becomes difficult. Such paper also generates a lot of paper dust during printing.

The electrophotographic transfer paper proposed by the present invention is explained below. The types of pulp that can be used are the same as those usable for the aforementioned low-density printing paper. However, bleached chemical pulp should be added, preferably by 70 percent by weight or more, or more preferably by 80 percent by weight or more, with respect to the total pulp volume, in order to provide better properties in full-color printing and improve brightness.

The electrophotographic transfer paper should contain the aforementioned precipitated calcium carbonate-silica compound as a filler, preferably by 1 to 25 percent by weight, or more preferably by 3 to 25 percent by weight, or most preferably by 5 to 20 percent by weight. If the filler content in paper is below 1 percent by weight, sufficient bulk and opacity cannot be obtained, among others. If the ratio exceeds 25 percent by weight, stiffness and strength decrease significantly and the paper does not run smoothly during copying.

Under the present invention, precipitated calcium carbonate-silica compound is used as a filler. However, other fillers can also be used as long as use of such other fillers does not reduce the effect intended by the present invention. As for the specific types of fillers that can be used, one or more types selected from precipitated calcium carbonate, talc, magnesium carbonate, barium carbonate, aluminum hydroxide, calcium hydroxide, magnesium hydroxide, zinc hydroxide, clay, calcined kaolin, delaminated kaolin, titanium dioxide, zinc oxide, silicon oxide, non-crystalline silica and other inorganic fillers, as well as urea-formalin resin, polystyrene resin, phenol resin and other fine hollow particles, can be used together. When precipitated calcium carbonate-silica compound particles and other filler or fillers are used together, the ratio of all fillers to the paper should be preferably 1 or more but not exceeding 30 percent by weight, or more preferably 3 or more but not exceeding 25 percent by weight, or most preferably 5 or more but not exceeding 25 percent by weight. If the ratio exceeds 30 percent by weight, stiffness drops and the paper tends to exhibit poor run and efficiency on a copier, etc.

When producing the low-density neutral paper proposed by the present invention, after mixing the aforementioned pulp materials with precipitated calcium carbonate-silica compound alone or in combination with other filler or fillers, it is possible to add, as necessary, auxiliary chemicals normally used in papermaking, such as dry-strength agents, retention aid, wet-strength agents, dyes, fluorescent whitening agents, defoaming agents, pitch control agents, and slime control agents. Sizing agents can also be added to improve suitability for offset printing. With neutral to alkaline printing paper, known internal neutral sizing agents include alkyl-ketene-dimer (AKD) sizing agents, alkenyl succinic anhydride (ASA) sizing agents and neutral rhodine sizing agents. Among these, AKD and ASA sizing agents are more effective than neutral rhodine sizing agents when it comes to reducing paper density and are therefore considered more suitable in the production of low-density neutral paper. The amount of these sizing agents should be preferably adjusted to 0.05 to 5 percent by weight, or more preferably 0.1 to 1 percent by weight, with respect to the absolute dry weight of pulp. In the production of electrophotographic transfer paper, appropriate sizing agents, including these neutral sizing agents, rhodine sizing agents, synthetic sizing agents, petroleum resin sizing agents, etc., can be used in combination with fiber fixing agents such as aluminum sulfate and cationic starch. However, from the viewpoint of ensuring smooth run on copiers, printers, etc., as well as good storage stability of paper after copying, use of alkyl-ketene-dimer sizing agents and alkenyl succinic anhydride sizing agents is more preferable.

The paper machine used to produce the low-density neutral paper proposed by the present invention can be any known machine, such as a Fourdrinier paper machine, on-top twin wire paper machine, or gap former. As papermaking conditions, pulp-beating level, jet wire ratio, dewatering profile, pressing, calendering and other parameters are adjusted. Also, a desired drying condition can be set using any known method such as use of vapor pressure from the built-in drier of the paper machine, or by means of the ventilation method.

If the low-density neutral paper is used as low-density printing paper or neutral newsprinting paper, surface of the produced paper may be coated to improve surface strength, add water resistance, improve ink impression property, and for various other purposes. Coating systems that can be used are not limited to any specific types. Types of surface treatment agents are not limited at all, either, but examples include raw starch, oxidized starch, ester starch, cationic starch, enzyme-denatured starch, aldehydic starch, hydroxyethyl starch and other denatured starches; carboxymethyl cellulose, hydroxyethyl cellulose, methyl cellulose and other cellulose derivatives; polyvinyl alcohol, carboxyl-denatured polyvinyl alcohol and other denatured alcohols; styrene-butadiene copolymer, polyvinyl acetate, vinyl chloride-vinyl acetate copolymer, polyvinyl chloride, polyvinylidene chloride, polyacrylic ester, and polyacrylic amide, which can be used alone or in combination. In addition to the aforementioned chemicals, styrene acrylate, styrene maleate, maleic anhydride, olefin compounds, cationic sizing agents and other surface sizing agents can be used together in the form of surface coating.

If the low-density printing paper is used as electrophotographic transfer paper, various substances can be coated on the surface of the paper formed by the size press process, in order to improve surface strength, add water resistance, and improve toner impression property, among others. Examples include starch, polyvinyl alcohol, latex, maleic anhydride sizing agents, olefin sizing agents, styrene-acrylate sizing agents and various other surface sizing agents; ethylene-urea resin and other dimension stabilization agents; sodium chloride, potassium chloride, sodium sulfate and other inorganic conductive agents; dimethyl amino ethyl methacrylate and other organic conductive agents; surface active agents; pigments; and dies. The coating weight is adjusted to approx. 0.1 to 3 g/m². This way, an electrophotographic transfer paper offering excellent run and efficiency on copiers or laser beam printers can be obtained. In particular, the effect of the present invention can be realized more favorably if the grammage is reduced to a range of 40 to 65 g/m², or more preferably to a range of 40 to 60 g/m².

When coating each paper obtained as above, a conventional size press (2 rolls, pond method), gate-roll size press, rod-metering size press, metering-blade size press, bill blade coater, short dwell coater and other systems can be used.

Calendering is implemented at line pressures within a normal operating range. To produce low-density paper, however, it is desirable to reduce the line pressure as much as possible without compromising on paper smoothness, or use a bypass method. Soft calendering is more desirable than normal calendering.

The precipitated calcium carbonate-silica composite used in the present invention can be produced either by a method in which silicic acid is reacted in the process of generating calcium carbonate, or by a method in which silicic acid is reacted with the surface of produced calcium carbonate. Under the present invention, the method to react silicic acid with the surface of produced calcium carbonate is preferable in order to achieve a good balance of bulk, opacity, stiffness and other qualities. This method is explained in the following sections.

[Method of Producing Precipitated Calcium Carbonate-Silica Composite]

First, precipitated calcium carbonate is dispersed in water. The crystal pattern of this precipitated calcium carbonate may be calcite or aragonite, and the crystal can also have any shape such as needle, pillar, spindle, sphere, cube or rosette. Among others, rosette-calcite precipitated calcium carbonate provides precipitated calcium carbonate-silica composite that offers particularly high bulk and opacity improving effects. By the way, "rosette" refers to a shape where spindle-shaped primary precipitated calcium carbonate particles agglutinate with one another in burred chestnut shape, and is characterized by greater specific surface area and higher oil absorbency than other types of precipitated calcium carbonate. Also, precipitated calcium carbonate can be ground before use.

The concentration of the reaction solution of this precipitated calcium carbonate should preferably be 1 to 20 solid content percent by weight, although the effect of silicic acid concentration must also be considered to achieve an appropriate blending ratio of precipitated calcium carbonate and silicic acid as explained later. If the concentration is lower than 1 percent, production volume per batch decreases and sufficient productivity cannot be achieved. If the concentration is higher than 20 percent, dispersibility decreases and the concentration of alkaline silicate used in the reaction process increases in proportion to the amount of precipitated calcium carbonate. Consequently, viscosity increases during reaction and ease of handling drops as a result.

Next, silicic acid dissolved in an alkaline solution, such as sodium or potassium solution, is added to the slurry of the aforementioned precipitated calcium carbonate. In general, sodium silicate or potassium silicate is used in industrial applications. In producing the composite used in the present invention, the molar ratio of silicic acid to alkali can be adjusted to a desired level. No. 3 silicic acid has a $SiO_2$-to-$Na_2O$ molar ratio of 3:1 to 3.4:1 or thereabout. It is easily obtained and can be used favorably. The input ratio by weight of precipitated calcium carbonate and alkaline silicate is adjusted so that the ratio by weight of precipitated calcium carbonate and silica in the produced precipitated calcium carbonate-silica composite satisfies the target range. The ratio by weight of precipitated calcium carbonate and silica ($CaCO_3/SiO_2$) in precipitated calcium carbonate-silica composite should be 30/70 to 70/30.

The obtained slurry is agitated and dispersed using an agitator, homogenizing mixer, regular mixer, etc. The purpose here is to sufficiently disperse precipitated calcium carbonate in water in a manner free from significant agglutination of precipitated calcium carbonate particles, and therefore the agitation time, agitation level and other conditions are not limited in any way.

Next, the agitated slurry is neutralized with acid. Any acid can be used in this process, as long as it is mineral acid. Also, mineral acids that contain aluminum sulfate, magnesium sulfate and other acid metal salts can also be used. In industrial applications, use of acids that can be purchased at relatively low costs, such as sulfuric acid and hydrochloric acid, are preferred. If high-concentration acids are used, areas with low pH will be produced if agitation during acid neutralization is not sufficient, in which case precipitated calcium carbonate will dissolve. Therefore, strong agitation must be provided at the inlet from which acid is added, by using a homogenizing mixer, etc. On the other hand, use of excessively weak acids is not desirable because the total volume increases after adding acid. In this sense, an appropriate acid concentration is 0.05 N or above. Each aqueous solution of mineral acid or acid metal salt is added at temperatures not exceeding the boiling point of the mixture of aqueous solution of metal silicate, which is an alkali solution, and precipitated calcium carbonate. This neutralization process causes silicic acid content to precipitate and thereby produces non-crystalline silicic acid, which in turns coats the surface of precipitated calcium carbonate particles.

This acid addition process can be implemented in several steps. It is also possible to provide a curing time after adding acid. Here, "curing" refers to temporarily stopping the addition of acid and providing agitation only. Strong agitation and grinding can also be implemented during this curing time to control the particle shape and size.

Next, the acid-containing slurry obtained above is neutralized to a target pH of 7 to 9. In the process of coating precipitated calcium carbonate with precipitated silicic acid content, if the slurry remains acid (below pH 7), precipitated calcium carbonate dissolves. If the neutralization is terminated when the pH level is still high (over 9.0), silicic acid content does not precipitate sufficiently and unreacted silicic acid content remains in the slurry as a result. This increases loss of silicic acid content, which is not desirable in industrial applications. Therefore, neutralization should be terminated after achieving the target pH of 7 to 9.

Thus produced precipitated calcium carbonate-silica composite is a suspended solution containing precipitated calcium carbonate particles whose surface is coated with silica. This suspended solution can be used in the papermaking process, etc., directly, but it is desirable to apply solid-liquid separation and remove as much excess salt byproduct as possible that was generated in the neutralization reaction process, by using filter paper, membrane filter or other filtration equipment if the production scale is small, or by using a belt filter, drum filter or other filtration equipment or by means of centrifugal separation with a centrifugal separator if the production scale is medium or large. This is because if excess salt remains, this salt may turn into metal salt of poor solubility (such as calcium sulfate) during the papermaking process, thereby causing scaling problem. Also, the cake-shaped composite with a solid content of 10 to 50 percent, obtained by the aforementioned solid-liquid separation, can be dispersed again in water or ethanol and run through another solid-liquid separation process, in order to remove excess silicic acid or salt byproduct further.

Thus obtained precipitated calcium carbonate-silica composite is passed through a vibration sieve or screen to remove particles of 100 μm or larger, in order to remove coarse particles exceeding the target particle size.

The average particle size of precipitated calcium carbonate-silica composite can be adjusted by controlling the particle shape and size by means of providing strong agitation or grinding during the curing time as mentioned above. Another way is to use a wet grinder to process the composite obtained by neutralization reaction, or after additional solid-liquid separation following neutralization reaction, to adjust the particles to the target average particle size. The aforementioned methods can also be used in combination to adjust the average particle size.

After removal of coarse particles, or after strong agitation or grinding following removal of coarse particles, the average particle size of precipitated calcium carbonate-silica composite should be preferably 30 μm or less, or more preferably 20 μm or less, or most preferably 1 to 10 μm.

By using precipitated calcium carbonate-silica composite as obtained above, a low-density neutral paper offering high blk and excellent opacity, opacity after printing (reduced strike-through) and stiffness can be obtained. This low-density neutral paper is suitable as offset printing paper, letterpress printing paper, newsprinting paper and electrophotographic transfer paper, and can also be used as thermosensitive recording paper, pressure-sensitive recording paper, inkjet paper, etc.

EXAMPLES

The present invention is explained in detail using examples below. Note, however, that the present invention is not at all limited to these examples. Percent and part(s) in the examples and comparative examples indicate percent by weight, and part(s) by weight, respectively.

The methods to measure the characteristics of precipitated calcium carbonate-silica composite used in the present invention, as well as qualities of paper produced by blending such precipitated calcium carbonate-silica composite as a filler, are explained below.

Evaluation of Filler Characteristics (1) Oil absorbency: In accordance with the method specified under JIS K 5101.

(2) Measurement of particle size distribution: A slurry comprising precipitated calcium carbonate-silica composite was dripped into pure water in which a dispersant, or specifically sodium hexametaphosphate, had been added to 0.2% by weight, to obtain a uniform dispersion, after which the particle size was measured using a laser particle-size measuring equipment (Master Sizer S manufactured by Malvern Instruments Ltd.) to obtain the average particle size.

Evaluation of Paper Characteristics (3) Method to make paper for characteristic evaluation Low-density printing paper: LBKP slurry (freeness: 370 ml CSF) was used as a paper material, and a slurry of precipitated calcium carbonate-silica composite was added as a filler at varying ratios of 5, 10 and 15% to the pulp, to make paper with a grammage of 60 g/m$^2$ using a directional paper machine manufactured by Kumagai Riki Kogyo Co., Ltd. The obtained paper was dewatered by a press and dried by a blow dryer to obtain sheet samples of respective blending ratios.

Neutral newsprinting paper: Newspaper disintegrated material (NBKP/MP/DIP=20/50/30 with an introduced ash content of 4%) not containing filler was used as a paper material, and a filler was added to the material pulp to make paper with a grammage of 40 g/m$^2$ using a directional paper machine manufactured by Kumagai Riki Kogyo Co., Ltd. The obtained paper was dewatered by a press and dried by a blow dryer to obtain sheet samples of respective blending ratios.

Electrophotographic transfer paper: A pulp mixture comprising 85 parts by weight of broad-leaved kraft pulp (freeness: 370 ml CSF) and 15 parts by weight of coniferous kraft pulp (freeness: 470 ml CSF) was used as a material pulp, and additives including 1.0% of neutral rhodine sizing agent (trade name: NT-87 manufactured by Arakawa Chemical Industries, Ltd.) and 0.8% of cationic starch (trade name: CATO304 manufactured by Nippon NSC Ltd.), 0.02% of cationic polyacrylic amide and 0.01% of anionic polyacrylic amide added as retention aid, and fillers, were added to the slurry (all percentages are with respect to the pulp). Then, paper was made using an on-top twin wire machine, and a size press solution containing 6% of starch (trade name: TC-Starch manufactured by Nihon Shokuhin Kako Co., Ltd.), 0.5% of sizing agent (trade name: PM1308 manufactured by Arakawa Chemical Industries, Ltd.), and sodium chloride and sodium carbonate added as conductive agents, was coated on both sides of paper to 1.0 g/m$^2$, after which the coated paper was dried to produce an electrophotographic transfer paper with a grammage of 60 g/m$^2$.

(4) Measurement of paper brightness and opacity

Brightness and opacity: Brightness and opacity were measured using a colorimeter (manufactured by Murakami Color Research Laboratory Co., Ltd.) in conformance with JIS P 8148 and JIS P 8149.

(5) Strike-through level: Each paper sample was printed on one side using a RI printer and keyless offset newspaper printing ink (New King VANTEAN Chinese Ink manufactured by Toyo Ink Mfg. Co., Ltd.). The printed paper was left in an ambience of 20° C. and 65% RH for 24 hours, after which the reflectance on the back side was measured using a Macbeth reflection density meter and the strike-through level (opacity after printing) was calculated by the formula below:

Strike-through level(%)=(Reflectance on back side of printed paper/Reflectance on back side of non-printed paper)×100

(6) Breaking length: Breaking length was measured using a tensile strength tester (SE062/064 manufactured by Lorentzen & Wettre, Inc.).

(7) Bulk ratio: Bulk ratio was calculated by the following formula based on the measured thickness of each sheet sample. Each sheet sample was burned at 525° C. to measure the ash content, and correlation diagrams of filler content in paper vs. brightness, filler content in paper vs. opacity, filler content in paper vs. breaking length, and filler content in paper vs. bulk ratio, were obtained. From these diagrams, brightness, opacity, breaking length and bulk ratio at a filler content in paper of 7% were obtained.

Bulk ratio=(1−Density of sample/Density of sample not containing filler)×100

(8) Stockigt sizing degree: Measured in conformance with JIS P 8122.

(9) Tensile stiffness: Measured using a tensile strength tester (SE062/064 manufactured by Lorentzen & Wettre, Inc.).

(10) Suitability for electrophotographic copier: One hundred sheets were copied on both sides in succession using a copier (NP6250 manufactured by Canon, Inc.) and an A4R tray, and the obtained copies were visually examined to evaluate paper feed property, transfer property (run, efficiency), image quality (appropriateness of image), and strike-through.

○: Paper feed property, transfer property, image quality and strike-through are all good.

Δ: Paper feed property, transfer property, image quality or strike-through is slightly poor.

x: Paper feed property, transfer property, image quality or strike-through is poor.

The methods of producing precipitated calcium carbonate-silica composites added as fillers in the examples of low-density printing paper and neutral newsprinting paper are explained below.

(Precipitated Calcium Carbonate-Silica Composite A)

First, 262 g of commercially available rosette precipitated calcium carbonate (trade name: Albacar 5970 manufactured by Specialty Minerals, Inc.) was introduced to a reaction container (12 L) and dispersed in water, and then a sodium silicate solution with a $SiO_2$ concentration of 18.0 wt/wt % and $Na_2O$ concentration of 6.1 wt/wt % was added by 3,400 g, after which water was added to adjust the total volume to 12 L.

(Precipitated Calcium Carbonate-Silica Composite B)

Composite B was produced in the same manner as described in the above, except that 612 g of commercially available rosette precipitated calcium carbonate was used. The average particle size and oil absorbency of this 50/50 precipitated calcium carbonate/silica composite were 4.4 μm and 160 ml per 100 g, respectively.

(Precipitated Calcium Carbonate-Silica Composite C)

Composite C was produced in the same manner as described in the above, except that 1,436 g of commercially available rosette precipitated calcium carbonate was used. The average particle size and oil absorbency of this 70/30 precipitated calcium carbonate/silica composite were 3.6 μm and 140 ml per 100 g, respectively.

Example 1

A sheet sample for low-density printing paper was created in accordance with the method described above, using precipitated calcium carbonate-silica composite A as a filler. The measured results of brightness, opacity, breaking length and bulk ratio at a filler content in paper of 7% are shown in Table 1.

Example 2

A sheet sample for low-density printing paper was created in accordance with the method described above, using precipitated calcium carbonate-silica composite B as a filler. The measured results of brightness, opacity, breaking length and bulk ratio at a filler content in paper of 7% are shown in Table 1.

Example 3

A sheet sample for low-density printing paper was created in accordance with the method described above, using precipitated calcium carbonate-silica composite C as a filler. The measured results of brightness, opacity, breaking length and bulk ratio at a filler content in paper of 7% are shown in Table 1.

Comparative Example 1

A sheet sample for printing paper was created in the same manner as described in Example 1, except that commercially available rosette precipitated calcium carbonate (trade name: Albacar 5970 manufactured by Specialty Minerals, Inc.) was used directly as a filler, without being composited with any other substance. The measured results of brightness, opacity, breaking length and bulk ratio at a filler content in paper of 7% are shown in Table 1.

Comparative Example 2

A sheet sample for printing paper was created in the same manner as described in Example 1, except that commercially available spindle-shaped precipitated calcium carbonate (trade name: TP121 manufactured by Okutama Kogyo Co., Ltd.) was used directly as a filler, without being compounded with any other substance. The measured results of brightness, opacity, breaking length and bulk ratio at a filler content in paper of 7% are shown in Table 1. For your reference, TP121 is precipitated calcium carbonate comprising spindle-shaped primary particles and does not have the structure of primary particles agglutinating with one another to form secondary particles.

Comparative Example 3

A sheet sample for printing paper was created in the same manner as described in Example 1, except that commercially available white carbon (trade name: TIXOLEX17 manufactured by Rhodia Silica Korea Co., Ltd.) was used directly as a filler, without being compounded with any other substance. The measured results of brightness, opacity, breaking length and bulk ratio at a filler content in paper of 7% are shown in Table 1.

Comparative Example 4

A sheet sample for printing paper was created in the same manner as described in Example 1, except that a 50:50 mixture of commercially available white carbon (trade name: TIXOLEX17 manufactured by Rhodia Silica Korea Co., Ltd.) and commercially available rosette precipitated calcium carbonate (trade name: Albacar 5970 manufactured by Specialty Minerals, Inc.) was used directly as a filler, without being compounded with any other substance. The measured results of brightness, opacity, breaking length and bulk ratio at a filler content in paper of 7% are shown in Table 1. The average particle size and oil absorbency of the 50/50 TIXOLEX17/Albacar filler mixture were 3.8 μm and 137 ml per 100 g, respectively.

Comparative Example 5

A sheet sample for printing paper was created in the same manner as described in Example 1, except that no filler was used. The measured results of brightness, opacity, breaking length and bulk ratio at a filler content in paper of 7% are shown in Table 1.

TABLE 1

| | Filler properties | | | Paper qualities | | | |
|---|---|---|---|---|---|---|---|
| | Average particle size μm | Oil absorbency ml/100 g | BET specific surface area m²/g | Brightness % | Opacity % | Breaking length km | Bulk ratio % |
| Example 1 | 7.3 | 180 | 30 | 87.2 | 83.0 | 3.4 | 8.0 |
| Example 2 | 4.4 | 160 | 28 | 87.4 | 83.4 | 3.3 | 7.7 |
| Example 3 | 3.6 | 140 | 26 | 87.5 | 83.8 | 3.2 | 7.3 |
| Comparative Example 1 | 2.4 | 121 | 12 | 87.6 | 82.6 | 3.5 | 2.8 |
| Comparative Example 2 | 1.2 | 48 | 5 | 86.4 | 82.3 | 3.6 | 1.6 |
| Comparative Example 3 | 5.2 | 230 | 52 | 87.2 | 82.1 | 3.4 | 8.2 |
| Comparative Example 4 | 3.8 | 137 | 23 | 87.1 | 82.4 | 3.6 | 3.9 |
| Comparative Example 5 | — | — | — | 84.6 | 77.4 | 4.9 | — |

The results in Table 1 show that the samples obtained by Examples 1, 2 and 3, where precipitated calcium carbonate-silica composite was used as a filler, provided higher bulk at the same filler content in paper compared to the sample obtained by Comparative Example 1 where precipitated calcium carbonate was used as a key ingredient of precipitated calcium carbonate-silica composite. Next, the sample obtained by Comparative Example 2, where precipitated calcium carbonate constituted by spindle-shaped primary particles was used as a filler, exhibited lower opacity and bulk than the samples obtained by Examples 1, 2 and 3. As for the sample obtained by Comparative Example 3 where white carbon offering high bulk was used as a filler, white carbon filler did increase bulk effectively, but improvement of opacity was limited, and the sample failed to achieve high bulk and opacity at the same time as the samples obtained by Examples 1, 2 and 3 did. On the other hand, the sample obtained by Comparative Example 4, where a mixture of precipitated calcium carbonate and silica was used, failed to increase bulk. The sample containing no filler as obtained by Comparative Example 5 exhibited lower bulk and opacity compared to all other samples. As evident from these results, use of precipitated calcium carbonate-silica composite as a filler provides a low-density printing paper offering high bulk and excellent opacity and opacity after printing.

Example 4

A neutral newsprinting paper with a filler content in paper of 7% was created in accordance with the method described above, using precipitated calcium carbonate-silica composite A as a filler. The brightness, opacity and strike-through level of the obtained paper are shown in Table 2.

Example 5

A neutral newsprinting paper with a filler content in paper of 7% was created in accordance with the method described above, using precipitated calcium carbonate-silica composite B as a filler. The brightness, opacity and strike-through level of the obtained paper are shown in Table 2.

Example 6

A neutral newsprinting paper with a filler content in paper of 7% was created in accordance with the method described above, using precipitated calcium carbonate-silica composite C as a filler. The brightness, opacity and strike-through level of the obtained paper are shown in Table 2.

Example 7

A neutral newsprinting paper was created in the same manner as described in Example 4, except that precipitated calcium carbonate-silica composite B was added to a filler content in paper of 1%, and commercially available rosette precipitated calcium carbonate (trade name: Albacar 5970 manufactured by Specialty Minerals, Inc.) was added to a filler content in paper of 7%, respectively, as fillers. The brightness, opacity and strike-through level of the obtained paper are shown in Table 2.

Comparative Example 6

A neutral newsprinting paper with a filler content in paper of 7% was created in the same manner as described in Example 4, except that commercially available rosette precipitated calcium carbonate (trade name: Albacar 5970 manufactured by Specialty Minerals, Inc.) was used directly as a filler, without being compounded with any other substance. The brightness, opacity and strike-through level of the obtained paper are shown in Table 2.

Comparative Example 6

A neutral newsprinting paper with a filler content in paper of 7% was created in the same manner as described in Example 4, except that commercially available rosette precipitated calcium carbonate (trade name: Albacar 5970 manufactured by Specialty Minerals, Inc.) was used directly as a filler, without being compounded with any other substance. The brightness, opacity and strike-through level of the obtained paper are shown in Table 2.

Comparative Example 7

A neutral newsprinting paper with a filler content in paper of 7% was created in the same manner as described in Example 4, except that commercially available spindle-shaped precipitated calcium carbonate (trade name: TP121 manufactured by Okutama Kogyo Co., Ltd.) was used directly as a filler, without being compounded with any other substance. The brightness, opacity and strike-through level of the obtained paper are shown in Table 2. For your reference, TP121 is precipitated calcium carbonate comprising spindle-shaped primary particles and does not have the structure of primary particles agglutinating with one another to form secondary particles.

Comparative Example 8

A neutral newsprinting paper with a filler content in paper of 7% was created in the same manner as described in Example 4, except that commercially available angular-shaped precipitated calcium carbonate was used directly as a filler, without being compounded with any other substance. The brightness, opacity and strike-through level of the obtained paper are shown in Table 2. For your reference, this precipitated calcium carbonate is precipitated calcium carbonate comprising angular-shaped primary particles and does not have the structure of primary particles agglutinating with one another to form secondary particles.

Comparative Example 9

A neutral newsprinting paper was created in a manner containing commercially available rosette precipitated calcium carbonate (trade name: Albacar 5970 manufactured by Specialty Minerals, Inc.) to a filler content in paper of 3.5%, and commercially available white carbon (trade name: TIXOLEX17 manufactured by Rhodia Silica Korea Co., Ltd.) to a filler content in paper of 3.5%. The brightness, opacity and strike-through level of the obtained paper are shown in Table 2.

Comparative Example 10

A neutral newsprinting paper was created in a manner containing commercially available rosette precipitated calcium carbonate (trade name: Albacar 5970 manufactured by Specialty Minerals, Inc.) to a filler content in paper of 4.9%, and commercially available white carbon (trade name: TIXOLEX17 manufactured by Rhodia Silica Korea Co., Ltd.) to a filler content in paper of 2.1%. The brightness, opacity and strike-through level of the obtained paper are shown in Table 2.

Comparative Example 11

A neutral newsprinting paper was created in a manner containing commercially available rosette precipitated calcium carbonate (trade name: Albacar 5970 manufactured by Specialty Minerals, Inc.) to a filler content in paper of 7.0%, and commercially available white carbon (trade name: TIXOLEX17 manufactured by Rhodia Silica Korea Co., Ltd.) to a filler content in paper of 1.0%. The brightness, opacity and strike-through level of the obtained paper are shown in Table 2.

Comparative Example 12

A neutral newsprinting paper was created in a manner containing commercially available white carbon (trade name: TIXOLEX17 manufactured by Rhodia Silica Korea Co., Ltd.) to a filler content in paper of 2.0%. The brightness, opacity and strike-through level of the obtained paper are shown in Table 2.

TABLE 2

| | Precipitated calcium carbonate-silica composite Filler content in paper % | Precipitated calcium carbonate Filler content in paper % | White carbon Filler content in paper % | Filler Average particle size μm | Filler Oil absorbency ml/100 g | Paper qualities Brightness % | Paper qualities Opacity % | Paper qualities Strike-through level % |
|---|---|---|---|---|---|---|---|---|
| Example 4 | 7 | | | 7.3 | 180 | 55.0 | 95.1 | 95.6 |
| Example 5 | 7 | | | 4.4 | 160 | 55.4 | 95.4 | 95.6 |
| Example 6 | 7 | | | 3.6 | 140 | 55.9 | 95.7 | 95.7 |
| Example 7 | 1 | 7 | | | | 56.4 | 95.4 | 97.5 |
| Comparative Example 6 | | 7 | | 2.4 | 121 | 54.9 | 95.0 | 92.5 |
| Comparative Example 7 | | 7 | | 1.2 | 48 | 54.9 | 94.9 | 91.4 |
| Comparative Example 8 | | 7 | | 2.3 | 86 | 54.2 | 94.6 | 92.5 |
| Comparative Example 9 | | 3.5 | 3.5 | | | 51.6 | 93.5 | 91.6 |
| Comparative Example 10 | | 4.9 | 2.1 | | | 52.9 | 94.0 | 90.3 |
| Comparative Example 11 | | 7 | 1 | | | 55.5 | 95.1 | 95.0 |
| Comparative Example 12 | | | 2 | 5.2 | 230 | 50.3 | 92.4 | 89.4 |

As shown, the samples obtained by Examples 4, 5 and 6, where precipitated calcium carbonate-silica composite was used as a filler, exhibited better brightness, opacity and strike-through level compared to the samples obtained by Comparative Examples 6 through 8 where various types of precipitated calcium carbonate were used as fillers, and also compared to the samples obtained by Comparative Examples 9 and 10 where precipitated calcium carbonate and white carbon were used together as fillers. Also, the sample obtained by Example 7, where a small amount of precipitated calcium carbonate-silica composite was used with a precipitated calcium carbonate filler, exhibited higher brightness, opacity and strike-through level compared to the sample obtained by Comparative Example 11 where a small amount of white carbon was used with a precipitated calcium carbonate filler. As for the sample obtained by Comparative Example 12, where white carbon was used alone, it is normally difficult to increase the filler content in paper to 2% or above as it would result in strength drop and powder generation. The samples obtained by Examples 4 through 7 exhibited superior brightness, opacity and strike-through level compared to the sample obtained by Comparative Example 12 containing a high percentage of white carbon. As evident from these results, use of precipitated calcium carbonate-silica composite as a filler provides an excellent neutral newsprinting paper exhibiting high brightness, high opacity and reduced strike-through after printing.

The methods of producing precipitated calcium carbonate-silica composites used under the present invention in the production of electrophotographic transfer paper, as well as examples and comparative examples of electrophotographic transfer paper using these composites, are explained below.

<Production Methods of Precipitated Calcium Carbonate-Silica Composites>

(Preparation of Precipitated Calcium Carbonate-Silica Composite D)

First, 10.3 kg of commercially available rosette precipitated calcium carbonate (trade name: Albacar 5970 manufactured by SMI) was introduced to a reaction container (200 L) and dispersed in water, and then a sodium silicate solution with a $SiO_2$ concentration of 18.0 wt/wt % and $Na_2O$ concentration of 6.1 wt/wt % was added by 57 kg, after which water was added to adjust the total volume to 200 L. The slurry mixture was then agitated thoroughly under heat using an agitator until the temperature reached 85° C. Into the slurry, 10% sulfuric acid solution was added using a metering pump. To achieve sufficient agitation at the inlet of sulfuric acid, sulfuric acid was added directly below the agitation blades of the agitator. Sulfuric acid was added at a constant speed and constant temperature under conditions where the added sulfuric acid was fully dispersed, so that the final pH of 8.0 was achieved over the total sulfuric acid addition time of 240 minutes. The obtained slurry was processed through a 100 mesh sieve to separate coarse particles, and then filtered through a belt filter, after which the filtered slurry was dispersed again to approx. 10% to obtain samples for measurement of average particle size and analysis by manual papermaking. To obtain samples for measurement of oil absorbency and BET specific surface area, the filtered samples were dispersed again in ethanol to approx. 10%, filtered, and then dried using a drier adjusted to 105° C., to obtain powder samples. The average particle size and oil absorbency were 3.4 μm and 159 ml per 100 g, respectively. For your reference, the average particle size and oil absorbency of the commercially available rosette precipitated calcium carbonate used as a key ingredient were 3.0 μm and 119 ml per 100 g, respectively.

(Preparation of Precipitated Calcium Carbonate-Silica Composite E)

Composite E was prepared in the same manner as in the preparation of precipitated calcium carbonate-silica composite D, except that 23.5 kg of commercially available rosette precipitated calcium carbonate (trade name: Albacar 5970 manufactured by SMI) was used. When the properties of the obtained composite were measured, the average particle size and oil absorbency were 4.0 μm and 134 ml per 100 g, respectively.

(Preparation of Precipitated Calcium Carbonate-Silica Composite F)

Composite F was prepared in the same manner as in the preparation of precipitated calcium carbonate-silica composite D, except that 2.6 kg of commercially available rosette precipitated calcium carbonate (trade name: Albacar 5970 manufactured by SMI) was used. When the properties of the obtained composite were measured, the average particle size and oil absorbency were 8.0 μm and 160 ml per 100 g, respectively.

(Preparation of Precipitated Calcium Carbonate-Silica Composite G)

Composite G was prepared in the same manner as in the preparation of precipitated calcium carbonate-silica composite D, except that 41.2 kg of commercially available rosette precipitated calcium carbonate (trade name: Albacar 5970 manufactured by SMI) was used. When the properties of the obtained composite were measured, the average particle size and oil absorbency were 3.1 μm and 140 ml per 100 g, respectively.

Example 8

An electrophotographic transfer paper was created in accordance with the method described above, by adding precipitated calcium carbonate-silica composite D as a filler to a content of 5% with respect to the paper.

Example 9

An electrophotographic transfer paper was created in the same manner as described in Example 8, except that precipitated calcium carbonate-silica composite D was added as a filler to a content of 10% with respect to the paper.

Example 10

An electrophotographic transfer paper was created in the same manner as described in Example 8, except that precipitated calcium carbonate-silica composite E was used as a filler, instead of precipitated calcium carbonate-silica composite D.

Example 11

An electrophotographic transfer paper was created in the same manner as described in Example 9, except that precipitated calcium carbonate-silica composite E was used as a filler, instead of precipitated calcium carbonate-silica composite D.

Comparative Example 13

An electrophotographic transfer paper was created in the same manner as described in Example 8, except that precipitated calcium carbonate-silica composite F was used as a filler, instead of precipitated calcium carbonate-silica composite D.

Comparative Example 14

An electrophotographic transfer paper was created in the same manner as described in Example 8, except that precipitated calcium carbonate-silica composite G was used as a filler, instead of precipitated calcium carbonate-silica composite D.

Comparative Example 15

An electrophotographic transfer paper was created in the same manner as described in Example 8, except that commercially available rosette precipitated calcium carbonate (trade name: Albacar 5970 manufactured by SMI) was used directly as a filler, without being compounded with any other substance.

Comparative Example 16

An electrophotographic transfer paper was created in the same manner as described in Example 9, except that commercially available rosette precipitated calcium carbonate (trade name: Albacar 5970 manufactured by SMI) was used directly as a filler, without being compounded with any other substance.

Comparative Example 17

An electrophotographic transfer paper was created in the same manner as described in Example 8, except that commercially available white carbon (trade name: TIXOLEX17 manufactured by Rhodia Silica Korea) was used as a filler.

Comparative Example 18

An electrophotographic transfer paper was created in the same manner as described in Example 9, except that a 50:50 mixture of commercially available white carbon (trade name: TIXOLEX17 manufactured by Rhodia Silica Korea) and rosette precipitated calcium carbonate (trade name: Albacar 5970 manufactured by SMI) was used as a filler.

The results are shown in Table 3.

and its copier suitability was also poor. The sample obtained by Comparative Example 18, where a mixture of precipitated calcium carbonate and silica was used, exhibited lower bulk and opacity as well as slightly poor copier suitability.

INDUSTRIAL FIELD OF APPLICATION

The present invention relates to a low-density neutral paper offering excellent opacity and opacity after printing despite low density (high bulk), and this low-density neutral paper provided by the present invention can be suitably used as printing paper, neutral newsprinting paper or electrophotographic transfer paper, among others.

In particular, the low-density neutral paper provided by the present invention exhibits excellent bulk, opacity and opacity after printing, which are advantageous for industrial applications. If applied to printing paper, the present invention provide the benefits of high bulk and excellent opacity and opacity after printing as well as superior sizing property. If applied to newsprinting paper, the present invention provides the benefits of high brightness, excellent opacity and high strike-

TABLE 3

| | Precipitated calcium carbonate/silica ratio % | Filler content in paper % | Density g/cm³ | Opacity % | Brightness % | Stockigt sizing degree sec | Tensile stiffness MD kN/m | Copier characteristics |
|---|---|---|---|---|---|---|---|---|
| Example 8 | 50/50 | 5 | 0.49 | 81.6 | 84.8 | 53 | 450 | ○ |
| Example 9 | 50/50 | 10 | 0.47 | 84.3 | 86.0 | 42 | 420 | ○ |
| Example 10 | 70/30 | 5 | 0.49 | 81.6 | 84.7 | 61 | 453 | ○ |
| Example 11 | 70/30 | 10 | 0.47 | 84.4 | 85.9 | 54 | 422 | ○ |
| Comparative Example 13 | 20/80 | 5 | 0.51 | 80.6 | 83.7 | 20 | 350 | x |
| Comparative Example 14 | 80/20 | 5 | 0.52 | 81.2 | 84.4 | 55 | 410 | Δ |
| Comparative Example 15 | 100/0 | 5 | 0.52 | 81.2 | 84.5 | 62 | 410 | Δ |
| Comparative Example 16 | 100/0 | 10 | 0.51 | 83.9 | 85.5 | 56 | 390 | Δ |
| Comparative Example 17 | 0/100 | 5 | 0.47 | 80.6 | 84.2 | 11 | 300 | x |
| Comparative Example 18 | 50/50 | 10 | 0.50 | 83.8 | 85.7 | 25 | 400 | Δ |

Table 3 shows the test evaluation results. The samples obtained by Examples 8 through 11 exhibited low density (high bulk), excellent brightness and opacity, as well as superior copier suitability such as smooth run, image quality and strike-through, while maintaining stiffness, thereby demonstrating the advantage of using precipitated calcium carbonate-silica composite. The samples obtained by Examples 8 through 11, where precipitated calcium carbonate-silica composite was used as an internal filler, demonstrated higher bulk and opacity and superior copier suitability, compared to the samples obtained by Comparative Examples 15 and 16 where precipitated calcium carbonate was used as a key ingredient of precipitated calcium carbonate-silica composite. The sample obtained by Comparative Example 13, where the ratio of silica was higher than that of precipitated calcium carbonate, exhibited lower brightness and opaqueness as well as poor copier suitability due to reduced sizing property and stiffness. The sample obtained by Comparative Example 14, where the ratio of precipitated calcium carbonate was higher than that of silica, demonstrated lower bulk and slightly poor copier suitability. The sample obtained by Comparative Example 17 using white carbon showed lower opacity than the samples obtained by Examples. The sample of Comparative Example 17 also had lower tensile stiffness, which is an indicator of stiffness, and greater reduction in Stockigt sizing degree than the samples obtained by Examples. In particular, this sample exhibited marked drop in Stockigt sizing degree, through improvement effect after printing. If applied to electrophotographic transfer paper, the present invention achieves low density (high bulk), excellent brightness and opacity, and superior run and efficiency, while maintaining stiffness.

The invention claimed is:

1. A low-density neutral paper characterized by containing as a filler a precipitated calcium carbonate-silica composite wherein a surface of precipitated calcium carbonate particles is covered with silica and a ratio of precipitated calcium carbonate to silica (precipitated calcium carbonate/silica) is 30/70 to 70/30 in solid content by weight.

2. A low-density neutral paper according to claim 1, characterized in that the low-density neutral paper is any of a printing paper, neutral newsprinting paper, or electrophotographic transfer paper.

3. A low-density neutral paper according to claim 2, characterized in that the average particle size of the precipitated calcium carbonate-silica composite is 30 μm or less.

4. A low-density neutral paper according to claim 2, characterized in that the precipitated calcium carbonate particles used to produce the precipitated calcium carbonate-silica composite are constituted by rosette-calcite precipitated calcium carbonate where spindle-shaped primary particles agglutinate with one another to form secondary particles.

5. A low-density neutral paper according to claim 1, characterized in that the low-density neutral paper is a printing paper or electrophotographic transfer paper containing the precipitated calcium carbonate-silica composite at a filler content in paper of 1 to 25 solid content percent by weight.

6. A low-density neutral paper according to claim 5, characterized in that the average particle size of the precipitated calcium carbonate-silica composite is 30 μm or less.

7. A low-density neutral paper according to claim 5, characterized in that the precipitated calcium carbonate particles used to produce the precipitated calcium carbonate-silica composite are constituted by rosette-calcite precipitated calcium carbonate where spindle-shaped primary particles agglutinate with one another to form secondary particles.

8. A low-density neutral paper according to claim 1, characterized in that the low-density neutral paper is a neutral newsprinting paper containing the precipitated calcium carbonate-silica composite at a filler content in paper of 0.1 to 25 solid content percent by weight.

9. A low-density neutral paper according to claim 8, characterized in that the average particle size of the precipitated calcium carbonate-silica composite is 30 μm or less.

10. A low-density neutral paper according to claim 8, characterized in that the precipitated calcium carbonate particles used to produce the precipitated calcium carbonate-silica composite are constituted by rosette-calcite precipitated calcium carbonate where spindle-shaped primary particles agglutinate with one another to form secondary particles.

11. A low-density neutral paper according to claim 1, characterized in that the average particle size of the precipitated calcium carbonate-silica composite is 30 μm or less.

12. A low-density neutral paper according to claim 11, characterized in that the precipitated calcium carbonate particles used to produce the precipitated calcium carbonate-silica composite are constituted by rosette-calcite precipitated calcium carbonate where spindle-shaped primary particles agglutinate with one another to form secondary particles.

13. A low-density neutral paper according to claim 1, characterized in that the precipitated calcium carbonate particles used to produce the precipitated calcium carbonate-silica composite are constituted by rosette-calcite precipitated calcium carbonate where spindle-shaped primary particles agglutinate with one another to form secondary particles.

14. A low-density neutral paper which is a printing paper, neutral newsprinting paper, or electrophotographic transfer paper, comprising:
    pulp; and
    a filler comprising a composite of precipitated calcium carbonate-silica wherein precipitated calcium carbonate particles are coated with precipitated silicic acid component, if the in an amount of 0.1 to 25 solid content percent by weight to the paper if,
    wherein a ratio of precipitated calcium carbonate to silica (precipitated calcium carbonate/silica) in the composite of precipitated calcium carbonate-silica is 30/70 to 70/30 in solid content by weight.

15. The low-density neutral paper according to claim 14, wherein the composite of precipitated calcium carbonate-silica has an average particle size of 30 μm or less.

16. The low-density neutral paper according to claim 14, wherein the precipitated calcium carbonate particles are constituted by rosette-calcite precipitated calcium carbonate where spindle-shaped primary particles agglutinate with one another to form secondary particles.

17. The low-density neutral paper according to claim 14, wherein the filler comprises the composite of precipitated calcium carbonate-silica in an amount of 1 to 25 solid content percent by weight to the paper.

* * * * *

UNITED STATES PATENT AND TRADEMARK OFFICE
CERTIFICATE OF CORRECTION

PATENT NO. : 7,611,606 B2
APPLICATION NO. : 10/599135
DATED : November 3, 2009
INVENTOR(S) : Soga et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 430 days.

Signed and Sealed this

Twelfth Day of October, 2010

David J. Kappos
*Director of the United States Patent and Trademark Office*